Figure 1:
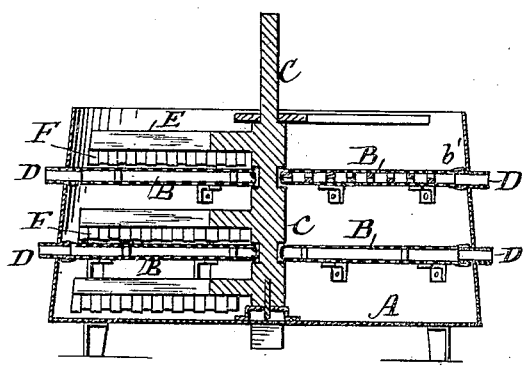

(No Model.)

A. G. FELL.
Filtering Tank.

No. 241,203. Patented May 10, 1881.

Witnesses
E. E. Masson
Philip Mauny

Inventor:
Ambrose G. Fell
by A. Pollok
his Atty.

United States Patent Office.

AMBROSE G. FELL, OF NEW YORK, N. Y., ASSIGNOR TO WILLIAM H. SMITH, OF URBANA, ILLINOIS.

FILTERING-TANK.

SPECIFICATION forming part of Letters Patent No. 241,203, dated May 10, 1881.

Application filed September 1, 1880. (No model.)

*To all whom it may concern:*

Be it known that I, AMBROSE G. FELL, of New York city, in the county and State of New York, have invented a new and useful Filtering-Tank, which is fully set forth in the following specification.

This invention relates to the separation by filtration of clear liquor from insoluble material which it holds in a state of suspension, and is more particularly intended for the separation of the thin saccharine solution from the insoluble gluten held in it after treating cornmeal for the production of glucose as described in the specification of my application for manufacture of glucose from grain, filed June 11, 1880.

The methods or means heretofore employed for filtering similar liquids are objectionable, owing to the stoppage of the pores or apertures of the filtering medium by the settlement on the same of the insoluble portion of the material filtered. This is alike true of filtering-bags, tanks with false strainer bottoms and sides, also of perforated tubes, and other devices of like character. The liquid to be separated from its insoluble matter when introduced into any of these devices at first filters freely; but as the minute currents of the filtrate pass through the filtering medium the insoluble material is drawn into close and compact contact with the latter, stopping the apertures through which the filtrate should pass, and thus retarding and finally stopping the process of filtration.

In filtering apparatus the rapidity of filtration is in proportion to the area and foraminous nature of the filtering medium employed; but in any event the operation ceases as insoluble matter accumulates, stopping up the foramina.

The object of this invention is to expose to the material filtered large surfaces of a nature as foraminous as possible, and at the same time to prevent the insoluble material from settling by holding it in perfect suspension until the clear solution is separated from it. This is accomplished by an arrangement of horizontal racks or strainers placed in a tank in connection with stirrers and sweepers. The stirrers are so arranged that they not only answer the purpose of keeping insoluble matter suspended, but also keep clear the surface of the strainers by continually sweeping them. Moreover, as the material decreases in volume in the tank they carry the remaining material from a higher to a lower strainer until the bottom of the tank is reached, and thence, at the pleasure of the operator, out of the tank at an outlet or outlets provided for the purpose.

The following description, taken in connection with the accompanying drawings, which form a part of this specification, will enable those skilled in the art to which it appertains to make and use the invention.

Figure 2:
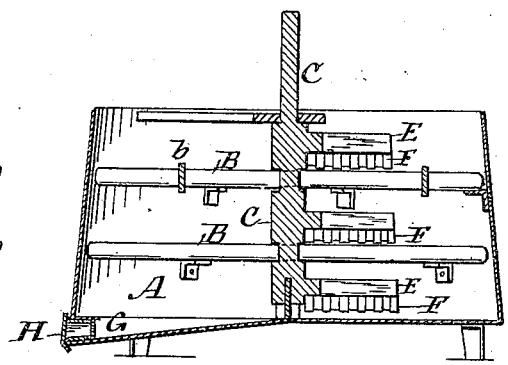
Figure 3:
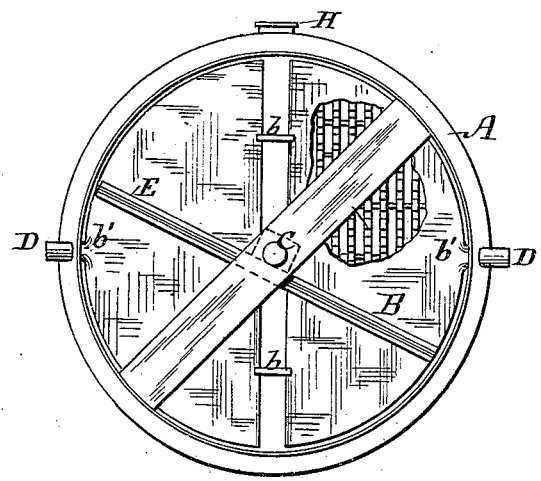

The said drawings illustrate the construction of a filter embodying the improvement, Figures 1 and 2 being central vertical sections in planes at right angles to each other; Fig. 3, a plan and Fig. 4 a detail, view on a larger scale.

The same letters indicate like parts wherever they occur.

Figure 4:
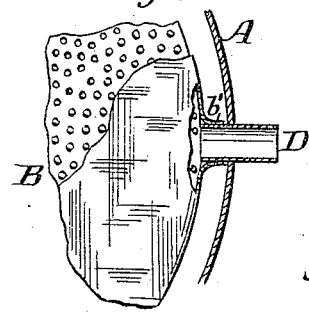

A is the filtering-tank, preferably of the form shown, with the sides inclining inward toward the top. No particular dimensions are essential; but in practice a diameter of about fifteen feet and a depth of three feet may be advantageously adopted. The tank may be made of wood, metal not liable to injuriously affect the filtrate, or of other suitable material. The interior is divided by a number of strainers, B, which rest upon supporting-pieces fastened to the sides of the tank. These strainers are of approximately similar form and of as large an area as the tank will allow. They are preferably made of a sort of lattice or frame work of narrow slats of wood covered top and bottom with one or more thicknesses of filtering-cloth. This construction is shown in the upper right-hand strainer, Fig. 1, and in Fig. 3. They may also be formed of perforated sheets of metal held a suitable distance apart and covered with filtering-cloth. This construction is shown in Fig. 4. By making the perforations in the metal plates close together, or by using wire-gauze, filter-cloth might in many cases be dispensed with. The strainers may be of any desired thickness, but ordinarily would be less proportionally than is represented.

In the center of the tank is supported a vertical shaft, C. The semicircular strainers are placed in pairs on each side of the shaft, an open space (see Fig. 3) being left between each pair. To retain the strainers in position small pieces, $b$, of wood or other suitable material, are or may be placed between their edges.

Through the sides of the tank extend a number of spouts, D, one or more for each strainer. With the interior of the strainers they are in communication by small hose, flexible tubes, or other hollow devices, $b'$, connected with the strainers at the curved edges.

On the shaft C are fixed horizontal stirrers E, from which depend short strips F, of rubber or other suitable flexible material. The number of stirrers correspond with that of the strainers, and they are arranged so that the lower stirrers move over the bottom of the tank and the others over the surface of the several strainers.

In the bottom of the tank is an outlet, G, closed, when required, by the stopper H.

The operation proceeds as follows: The stirrers E are set in motion by any convenient power, and as they traverse the area of the tank the flexible material F on their under edges sweeps over the surfaces of the strainers B, except that on the bottom stirrer, which sweeps over the bottom of the tank. The tank A is now filled with the material to be filtered, and the clear filtrate strains through the filter-cloth stretched on the wooden frame-work or perforated metal, or through whatever straining material is used, and is conducted to the edge of the strainer and out at the short hose $b'$, attached to pipes or spouts D in the side of the tank A. On account of the number of stirrers all operating simultaneously, and the extent of straining-surface kept unclogged by the rubber sweeps of the stirrers the filtration proceeds very rapidly. As the contents of the tank decrease the remaining material is swept off of the top strainers down the aperture formed by the two straight edges. It is thus carried from one rack to another until the bottom of the tank is reached or until the filtration is complete. The residue is discharged through the outlet G.

One great advantage of this filter is that it allows of the residue being thoroughly washed when desired without removal from the tank.

When the filtration has proceeded sufficiently far so that no more filtrate can be obtained the tank is refilled with clean water. If filtering worts from malt or saccharine solutions boiling water should be used. The stirrers remix the mass, and when it is sufficiently washed by them the clear liquor or wash-water is drawn off by reopening the strainer outlets or spouts. It is obvious that these could be provided with suitable cocks or valves.

Instead of making the strainers as before described, they might be composed of perforated pipes or tubes.

The stirrers and the tank itself may be made of any material or shape.

The invention is not limited in the details of the apparatus.

If desired, the stirrers might be provided with flexible material to sweep the under side of the strainers as well as the top.

Having now fully explained the invention and the manner of carrying the same into effect, what I claim is—

1. A filtering apparatus comprising a tank or vessel, one or more hollow strainers suitably disposed above the bottom of said tank, and stirrers arranged to sweep over the said strainer or strainers, and also over the bottom of the tank, substantially as described.

2. The combination, with a tank or vessel and a series of hollow strainers or filters provided with suitable outlets communicating with the interior and operating simultaneously, of stirrers revolving over or between said strainers or filters, substantially as described.

3. A hollow strainer having sides or walls independent of those of the tank or vessel in which it is placed, and provided with an outlet communicating with its interior, substantially as described.

4. An independent hollow strainer with a filtering-diaphragm on opposite sides of the strainer, and having an outlet communicating with the space between the diaphragm, substantially as described.

5. The combination of the following elements: A tank having a discharge-outlet at the bottom, a series of strainers located one above another, and provided each with a suitable outlet independent of the discharge-outlet at the bottom of the tank, and adapted to carry off the filtered liquid, and a series of stirrers moving over the surface of the strainers, an open space being left from top to bottom of the tank, past the several strainers, to permit insoluble matter to descend to the bottom of the tank, substantially as described.

In testimony whereof I have signed this specification in the presence of two subscribing witnesses.

A. G. FELL.

Witnesses:
 B. F. LEE,
 JOHN McCLURE.